United States Patent
Ogaki

(10) Patent No.: US 10,725,711 B2
(45) Date of Patent: Jul. 28, 2020

(54) INFORMATION PROCESSING APPARATUS, INFORMATION PROCESSING METHOD, AND COMPUTER-READABLE MEDIUM

(71) Applicant: CANON KABUSHIKI KAISHA, Tokyo (JP)

(72) Inventor: Tetsuro Ogaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/265,682

(22) Filed: Feb. 1, 2019

(65) Prior Publication Data

US 2019/0243587 A1 Aug. 8, 2019

(30) Foreign Application Priority Data

Feb. 5, 2018 (JP) ................. 2018-018182

(51) Int. Cl.
 *G06F 3/12* (2006.01)
 *H04N 1/00* (2006.01)
(52) U.S. Cl.
 CPC ............ *G06F 3/1205* (2013.01); *G06F 3/121* (2013.01); *G06F 3/1255* (2013.01); *G06F 3/1264* (2013.01); *G06F 3/1285* (2013.01); *H04N 1/00132* (2013.01)
(58) Field of Classification Search
 CPC .... G06F 3/1205; G06F 3/1285; G06F 3/1255; H04N 1/00132

USPC ........................................ 358/1.15
See application file for complete search history.

(56) References Cited

U.S. PATENT DOCUMENTS

| | | | |
|---|---|---|---|
| 2001/0019419 A1* | 9/2001 | Tomitaka | G06K 15/02 358/1.12 |
| 2005/0280840 A1* | 12/2005 | Sakura | H04N 1/00127 358/1.2 |
| 2012/0307262 A1* | 12/2012 | Fukuda | G06K 15/4005 358/1.2 |

FOREIGN PATENT DOCUMENTS

JP 2012-181774 A 9/2012

* cited by examiner

*Primary Examiner* — Tammy Paige Goddard
*Assistant Examiner* — Darryl V Dottin
(74) *Attorney, Agent, or Firm* — Canon U.S.A., Inc. I.P. Division

(57) ABSTRACT

An information processing apparatus includes a reception unit configured to receive a component size of a component actually used in printing from an image forming apparatus, and a transmission unit configured to transmit, to a post-processing apparatus, a job ticket of a post-processing job in which the component size received by the reception unit is set in a case where the component size of the component is referred to in post-processing.

17 Claims, 11 Drawing Sheets

FIG.5

| MERCHANDISE ID | PROCESS | COMPONENT | DEFAULT PARAMETER |
|---|---|---|---|
| PhotoBook A | PRINT | BODY | MEDIUM SIZE (BODY): 210 × 297 mm<br>DUPLEX |
| | PRINT | COVER | MEDIUM SIZE (COVER): 320 × 450 mm<br>SIMPLEX |
| | PERFECT BINDING | BODY<br>COVER | MEDIUM SIZE (BODY): 210 × 297 mm<br>MEDIUM SIZE (COVER): 320 × 450 mm<br>MILLING DEPTH: 1.5 mm |
| | TRIMMING | BODY<br>COVER | CONTENT SIZE (BODY): 210 × 297 mm<br>FINAL TRIM SIZE: 182 × 257 mm<br>TRIMMING OFFSET: 14 mm |
| Ticket B | PRINT | BODY | MEDIUM SIZE (BODY): 225 × 320 mm<br>SIMPLEX |
| | JOGGER | BODY | NONE |
| | CUTTING | BODY | MEDIUM SIZE (BODY): 225 × 320 mm<br>CUTTING SIZE: 210 × 297 mm<br>CUTTING ORIGIN: (7.5 mm, 11.5 mm) |

| ORDER ID | MERCHANDISE ID | FILE PATH |
|---|---|---|
| Order_0000001189 | PhotoBook A | BODY: C:\Images\Original\Book_Body.pdf<br>COVER: C:\Images\Original\Book_Cover.pdf |
| Order_0000001190 | Ticket B | BODY: C:\Images\Original\Ticket.pdf |
| Order_0000001191 | Flyer D | BODY: C:\Images\Original\Flyer.pdf |

| JOB ID | JOB PARAMETER | NECESSITY/ UNNECESSITY OF UPDATE | SUSPENSION STATE |
|---|---|---|---|
| Order_0000001189 Print Body | MEDIUM SIZE (BODY): 210 × 297 mm<br>DUPLEX | NOT NEEDED | FALSE |
| Order_0000001189 Print Cover | MEDIUM SIZE (COVER): 320 × 450 mm<br>SIMPLEX | NOT NEEDED | FALSE |
| Order_0000001189 Perfect Binding | MEDIUM SIZE (BODY): 210 × 297 mm<br>MEDIUM SIZE (COVER): 320 × 450 mm<br>MILLING DEPTH: 1.5 mm | BODY COVER | TRUE |
| Order_0000001189 Trimming | CONTENT SIZE (BODY): 210 × 297 mm<br>FINAL TRIM SIZE: 182 × 257 mm<br>TRIMMING OFFSET: 14 mm | BODY COVER | TRUE |
| Order_0000001190 Print Body | MEDIUM SIZE (BODY): 225 × 320 mm<br>SIMPLEX | NOT NEEDED | FALSE |
| Order_0000001190 Jogger | NONE | NOT NEEDED | FALSE |
| Order_0000001190 Body Cutting | MEDIUM SIZE (BODY): 225 × 320 mm<br>CUTTING SIZE: 210 × 297 mm<br>CUTTING ORIGIN: (7.5 mm, 11.5 mm) | BODY | TRUE |

FIG.8

| JOB ID | JOB PARAMETER | NECESSITY/ UNNECESSITY OF UPDATE | SUSPENSION STATE |
|---|---|---|---|
| Order_0000001189 Print Body | MEDIUM SIZE (BODY): 210 × 297 mm DUPLEX | NOT NEEDED | FALSE |
| Order_0000001189 Print Cover | MEDIUM SIZE (COVER): 320 × 450 mm SIMPLEX | NOT NEEDED | FALSE |
| Order_0000001189 Perfect Binding | MEDIUM SIZE (BODY): 209 × 299 mm MEDIUM SIZE (COVER): 320 × 450 mm MILLING DEPTH: 1.5 mm | COVER | TRUE |
| Order_0000001189 Trimming | CONTENT SIZE (BODY): 209 × 299 mm FINAL TRIM SIZE: 182 × 257 mm TRIMMING OFFSET: 14 mm | NOT NEEDED | FALSE |
| Order_0000001190 Print Body | MEDIUM SIZE (BODY): 225 × 320 mm SIMPLEX | NOT NEEDED | FALSE |
| Order_0000001190 Jogger | NONE | NOT NEEDED | FALSE |
| Order_0000001190 Body Cutting | MEDIUM SIZE (BODY): 225 × 320 mm CUTTING SIZE: 210 × 297 mm CUTTING ORIGIN: (7.5 mm, 11.5 mm) | BODY | TRUE |

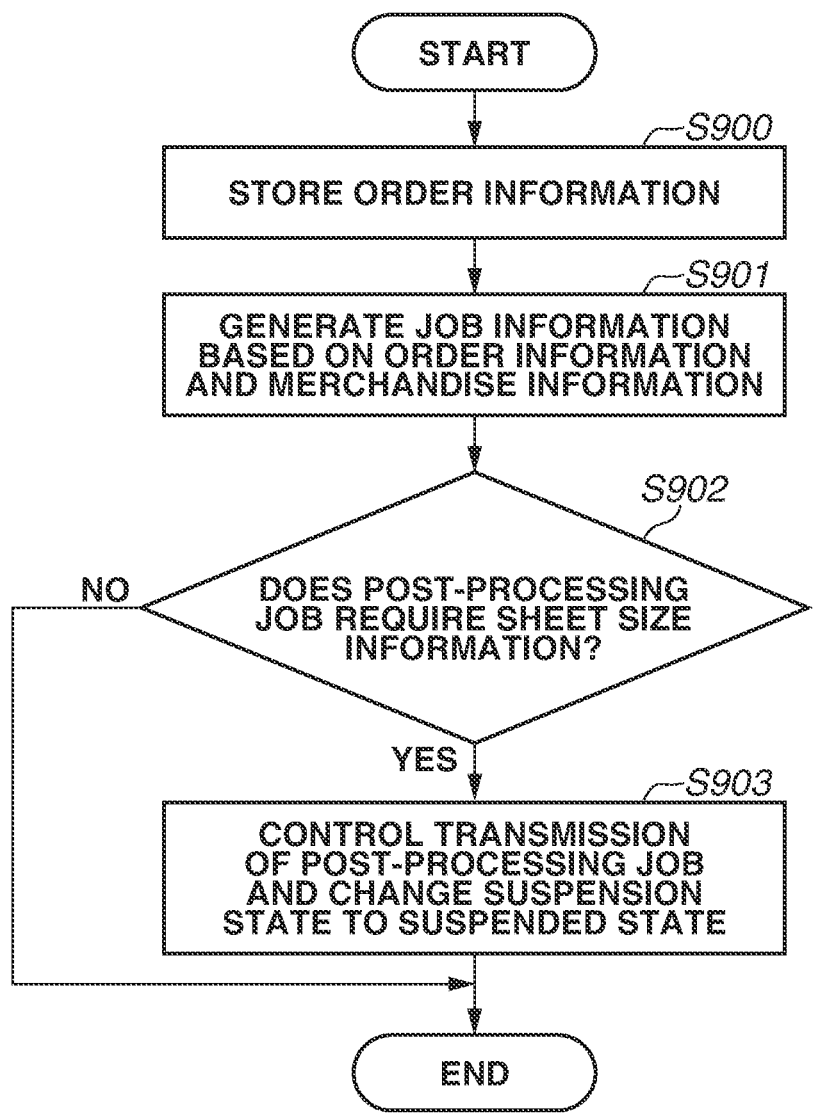

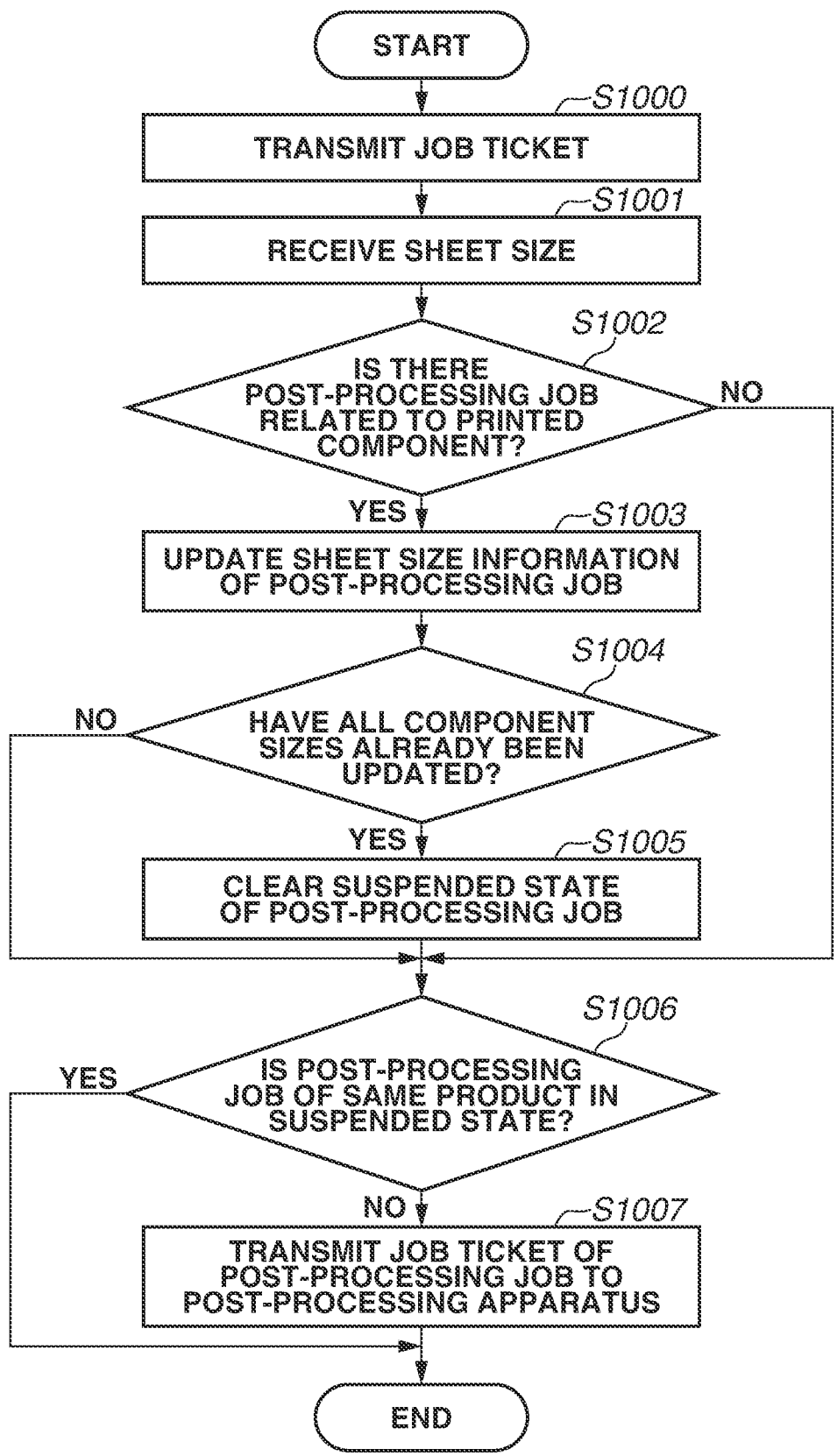

FIG.11

```xml
<?xml version="1.0" encoding="utf-8"?>
<JDF ID="NearLineMultiNodeJDF" Version="1.3" Type="Product" Status="Waiting" Activation="Active"
xmlns="http://www.CIP4.org/JDFSchema_1_1" xmlns:xsi="http://www.w3.org/2001/XMLSchema-instance"
DescriptiveName="BINDING1" JobPartID="Binding" JobID="Order_000001189 Perfect Binding">
  <ResourcePool>
    <Component ID="RES_000" Class="Quantity" Status="Unavailable" ComponentType="FinalProduct" />
    <Component ID="RES_001" Class="Quantity" Status="Unavailable" ComponentType="PartialProduct" Dimensions="660.4724409448818 92.9133858267711 24.9448818897631" /> ~ 1101
    <CoverApplicationParams ID="RES_002" Class="Parameter" Status="Available" NoOp="false" />
    <Component ID="RES_003" Class="Quantity" Status="Unavailable" ComponentType="PartialProduct" Dimensions="660.4724409448818 92.9133858267711 24.9448818897631" /> ~ 1102
    <SpinePreparationParams ID="RES_004" Class="Parameter" Status="Available" MillingDepth="4.2519685039370" />
    <Component ID="RES_005" Class="Quantity" Status="Unavailable" ComponentType="PartialProduct" Dimensions="1320.9448818897631 892.9133858267711 0.0000000000000" /> ~ 1103
  </ResourcePool>
  <JDF ID="Spin" Activation="Active" Type="SpinePreparation" Status="Waiting" JobPartID="Binding-1" JobID="Order_000001189 Perfect Binding">
    <ResourceLinkPool>
      <ComponentLink Usage="Output" rRef="RES_001" Amount="10" />
      <ComponentLink Usage="Input" rRef="RES_003" />
      <SpinePreparationParamsLink Usage="Input" rRef="RES_004" />
    </ResourceLinkPool>
  </JDF>
  <JDF ID="CApp" Activation="Active" Type="CoverApplication" Status="Waiting" JobPartID="Binding-2" JobID="Order_000001189 Perfect Binding">
    <ResourceLinkPool>
      <ComponentLink Usage="Input" rRef="RES_001" />
      <CoverApplicationParamsLink Usage="Input" rRef="RES_002" />
      <ComponentLink Usage="Output" rRef="RES_000" Amount="10" />
      <ComponentLink Usage="Input" rRef="RES_005" ProcessUsage="Cover" />
    </ResourceLinkPool>
  </JDF>
  <AuditPool>
    <Created TimeStamp="" />
  </AuditPool>
</JDF>
```

INFORMATION PROCESSING APPARATUS, INFORMATION PROCESSING METHOD, AND COMPUTER-READABLE MEDIUM

BACKGROUND OF THE INVENTION

Field of the Invention

The present disclosure relates to an information processing apparatus, an information processing method, and a computer-readable medium.

Description of the Related Art

Conventionally, in the commercial printing industry, various printed materials have been manufactured by combining an image forming apparatus and a post-processing apparatus. For example, products in a wide variety of formats, such as a book, a catalog, a flyer, a ticket, and a business card, can be manufactured by performing post-processing, such as bookbinding and cutting, on the printed materials subjected to print processing by the image forming apparatus. In workflow software designed for the commercial printing, a job for producing such a product is predefined as merchandise information according to a predetermined pattern of the product. The workflow software produces the product by associating the product for which an order is received and the merchandise information with each other, generating the job based on the associated merchandise information, and controlling a device based on the job. However, a parameter of the predefined job and a parameter used when the product is actually produced may fail to match each other. In Japanese Patent Application Laid-Open No. 2012-181774, a technique discussed therein compares sheet information in a print job and information on sheets set in a paper feed unit and recorded in advance to each other at the time of printing, and issues an alert if they do not match each other.

However, in the commercial printing, sheets used therein vary depending on sheet wholesalers from which the sheets are purchased, and the sheets are procured by cutting a large-sized base sheet at a printing site, due to which sizes thereof may be different on a several-millimeter scale. In such a case, although the printing can be carried out because the information on the sheets set in the paper feed unit of a digital printer and the sheet information in the print job match each other, a mismatch may occur between the actual sheet size and the parameter of the predefined post-processing job. The conventional technique can sometimes result in a mismatch between the parameter of the post-processing job and the actual sheet size, causing a jam and/or a positional deviation in a conveyance guide of the post-processing apparatus, thereby resulting in a failure to normally produce the product.

SUMMARY OF THE INVENTION

The present disclosure is generally related to an information processing apparatus and more particularly is directed to an information processing apparatus capable of preventing post-processing from becoming unable to be normally performed due to the difference between a size of a component actually used in the post-processing and a component size defined in the job.

According to an aspect of the present disclosure, an information processing apparatus includes a reception unit configured to receive a component size of a component actually used in printing from an image forming apparatus, and a transmission unit configured to transmit, to a post-processing apparatus, a job ticket of a post-processing job in which the component size received by the reception unit is set in a case where the component size of the component is referred to in post-processing.

Further features of the present disclosure will become apparent from the following description of exemplary embodiments with reference to the attached drawings.

BRIEF DESCRIPTION OF THE DRAWINGS

FIG. 5 is a diagram illustrating an example of a merchandise information table.
FIG. 6 is a diagram illustrating an example of an order information table.
FIG. 7 is a diagram illustrating an example of a job information table.
FIG. 8 is a diagram illustrating an example of the job information table after an update.
FIG. 9 is a flowchart illustrating order registration processing.
FIG. 10 is a flowchart illustrating control processing.
FIG. 11 illustrates an example of a job ticket of a post-processing job.

DESCRIPTION OF THE EMBODIMENTS

In the following description, exemplary embodiments will be described with reference to the drawings.

Figure 1:
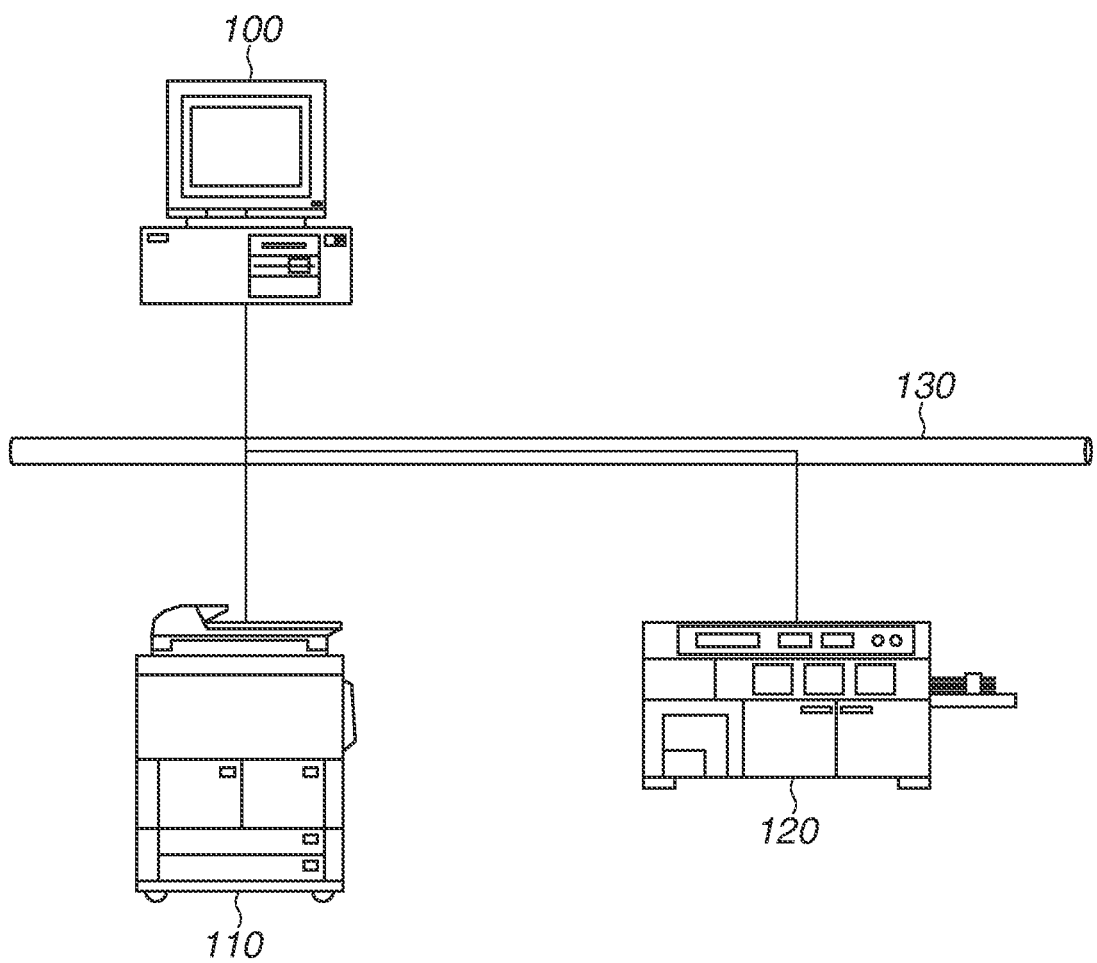
FIG. 1 is a diagram illustrating an entire printing system.

FIG. 1 illustrates an entire printing system according to an exemplary embodiment. The printing system includes an information processing apparatus 100, an image forming apparatus 110, and a post-processing apparatus 120. The information processing apparatus 100, the image forming apparatus 110, and the post-processing apparatus 120 are connected to one another via a network 130. The number of image forming apparatuses 110 and the number of post-processing apparatuses 120 included in the printing system shall not be limited to the exemplary embodiment, and both the number of image forming apparatuses 110 and the number of post-processing apparatuses 120 may be two or more.

The information processing apparatus 100 manages manufacturing of a printed material. The information processing apparatus 100 also controls the image forming apparatus 110 and the post-processing apparatus 120. The image forming apparatus 110 analyzes print data containing data to be printed that is transmitted from the information processing apparatus 100 or the like, converts the print data into a dot image page by page, and prints the print data. The image forming apparatus 110 may be a single-function printer or may be a multifunction peripheral. A printed material output from the image forming apparatus 110 is transferred to the post-processing apparatus 120 by being carried manually by a print operator, or is transferred to the post-processing apparatus 120 via a not-illustrated conveyor belt. The post-processing apparatus 120 is not physically connected to the image forming apparatus 110 but is capable of communicating with the image forming apparatus 110 and the information processing apparatus 100 via the network 130.

Figure 2:
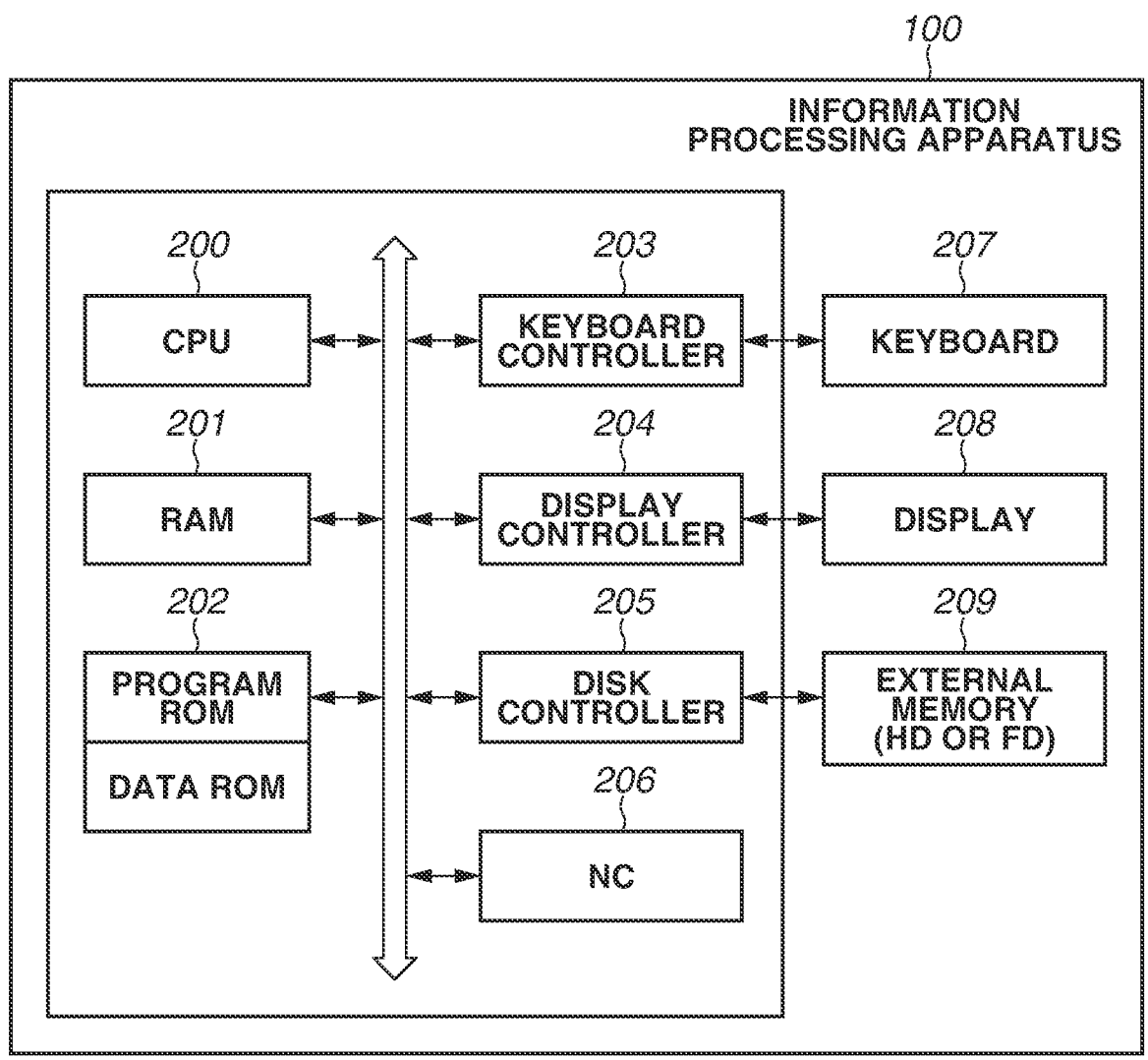
FIG. 2 is a block diagram illustrating a hardware configuration of an information processing apparatus.

FIG. 2 illustrates a hardware configuration of the information processing apparatus 100. The information processing apparatus 100 can be constructed with use of hardware of a commonly-used computer (personal computer (PC)). A central processing unit (CPU) 200 executes programs such as a program stored in a program read only memory (ROM) in a ROM 202, and an operating system (OS) and an application program loaded from an external memory 209 such as a hard disk into a random access memory (RAM) 201. The RAM 201 is a main memory of the CPU 200, and functions as a work area and the like. Functions and processing of the information processing apparatus 100 that will be described below are realized by the CPU 200 reading out the program stored in the ROM 202 or the external memory 209 and executing this program.

A keyboard controller 203 controls an operation input from a keyboard 207, or a not-illustrated barcode reader or pointing device (mouse, touch pad, touch panel, trackball, or the like). A display controller 204 controls display of a display 208. A disk controller 205 controls data access to the external memory 209, such as a hard disk (HD) and a flexible disk (FD) storing various kinds of data therein. A network controller (NC) 206 is connected to the network 130, and performs processing for controlling communication with another apparatus connected to the network 130.

Figure 3:
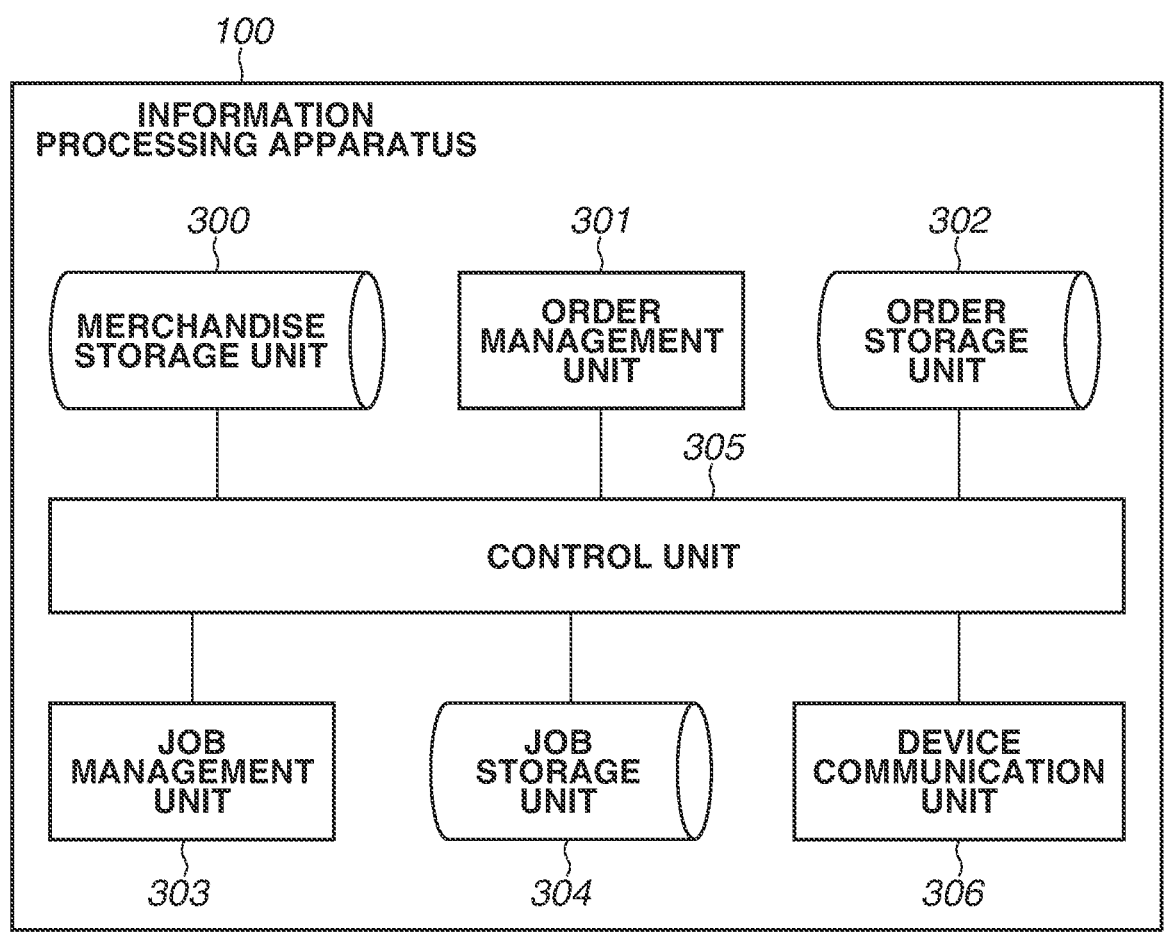
FIG. 3 is a block diagram illustrating a functional configuration of the information processing apparatus.

FIG. 3 illustrates a functional configuration of the information processing apparatus 100. A control unit 305 controls execution of each of functional units 300 to 306 of the information processing apparatus 100. A merchandise storage unit 300 stores merchandise information illustrated in FIG. 5 therein. The merchandise information is information that associates a merchandise identification (ID) for identifying merchandise with, for example, a required process and a job parameter based on which a product is produced. The merchandise information is registered with the merchandise storage unit 300 in advance before the product is produced. An order management unit 301 sets order information by associating the merchandise information registered with the merchandise storage unit 300 and information about a received order with each other, and stores the order information into an order storage unit 302 and manages it. The order information is information that associates an order ID for identifying the order information, the merchandise ID, and a file path of the print data with one another. The order management unit 301 analyzes information received from an upper-level application such as a management information system (MIS) or a server, and stores a result of the analysis into the order storage unit 302 as the order information.

A job management unit 303 acquires the merchandise information stored in the merchandise storage unit 300 by referring to the merchandise ID contained in the order information stored in the order storage unit 302. The job management unit 303 generates a job required to produce the product based on the acquired merchandise information, and registers the generated job with a job storage unit 304 and manages it. The job management unit 303 performs control so as to transmit a job ticket to the image forming apparatus 110 and the post-processing apparatus 120 via a device communication unit 306 by referring to information about the registered job. The device communication unit 306 controls communication with an external apparatus.

Figure 4:
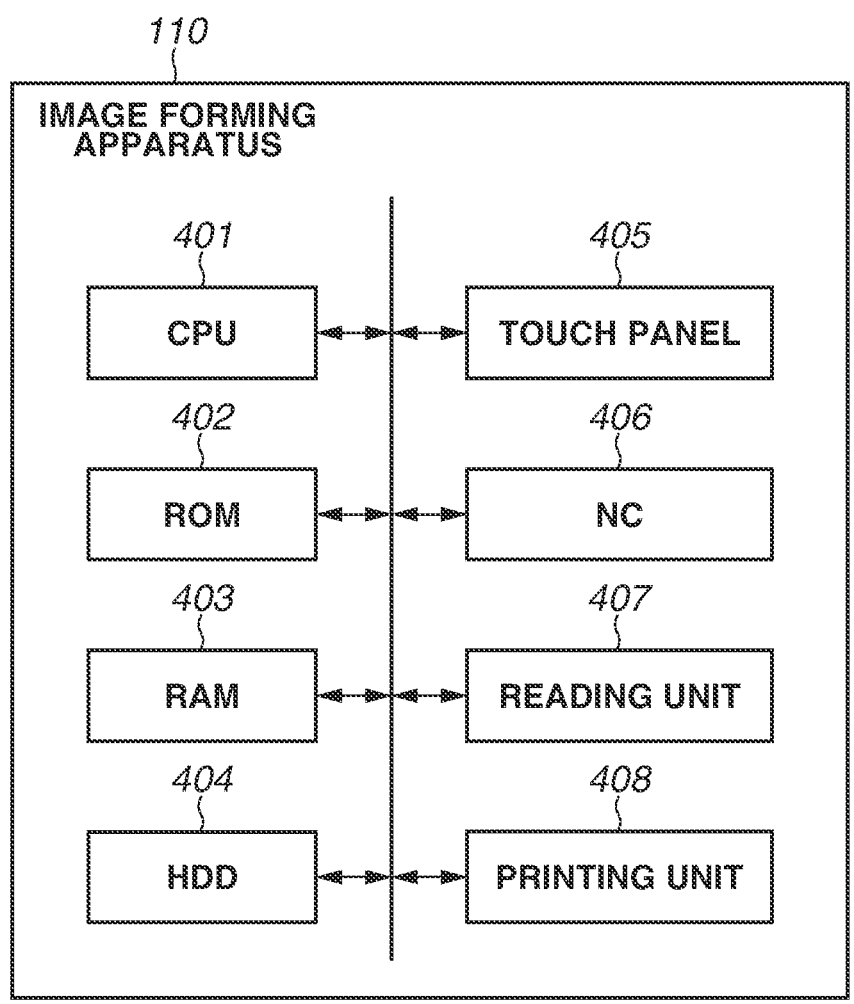
FIG. 4 is a block diagram illustrating a hardware configuration of an image forming apparatus.

FIG. 4 illustrates a hardware configuration of the image forming apparatus 110. The image forming apparatus 110 includes a CPU 401, a ROM 402, a RAM 403, a hard disk drive (HDD) 404, a touch panel 405, an network controller (NC) 406, a reading unit 407, and a printing unit 408. The CPU 401 reads out a control program stored in the ROM 402 to perform various kinds of processing. The CPU 401 controls, for example, the entire image forming apparatus 110 and processes an image. The CPU 401 also acquires sheet size information with use of a sensor or the like at the time of printing by the printing unit 408, which will be described below, and transmits it to the information processing apparatus 100 via the NC 406, which will be described below. Assume that the CPU 401 acquires and transmits a sheet size in unit of millimeter order. The RAM 403 is a main memory of the CPU 401, and functions as a work area and the like. The HDD 404 stores various kinds of data, various kinds of programs, and the like therein. Functions and processing of the image forming apparatus 110 that will be described below are realized by the CPU 401 reading out the program stored in the ROM 402 or the HDD 404 and executing this program.

The touch panel 405 receives a user operation and also displays various kinds of information thereon. The NC 406 performs processing for controlling communication with another apparatus via the network 130. The reading unit 407 includes, for example, a scanner, and can acquire a document image in an image data format by reading a paper document or the like. The CPU 401 performs processing for providing a document image stored in the HDD 404 or the like to the touch panel 405 to output the document image onto the touch panel 405. Further, the CPU 401 provides a document image stored in the HDD 404 to the printing unit 408. The printing unit 408 performs processing for outputting the document image in various formats. For example, the printing unit 408 can perform processing for outputting image data regarding the document image into a storage medium. Further, as another example, the printing unit 408 may be equipped with a printing function and perform processing for outputting the document image onto an output medium, such as a paper medium.

FIG. 5 illustrates an example of a merchandise information table 500 stored in the merchandise storage unit 300. A plurality of pieces of merchandise information (records) is stored in the merchandise information table 500. Each of the pieces of merchandise information (records) is information that associates the merchandise ID, the process, a component, and a default parameter with one another. The merchandise ID is an ID uniquely set for each pattern of the product. The process is information indicating a process required to produce the product. The job management unit 303 generates a job for each of such processes. The component is information regarding a component related to the corresponding process. For example, a body is stored in a printing process of the body, and the body and a front cover are stored in a bookbinding process, as the component. The default parameter is a default job parameter used for the job management unit 303 to generate the job regarding the corresponding process. For example, sheet size information of a sheet used to print the body, and a duplex/simplex setting are associated with the printing process of the body as the default parameter. In the present exemplary embodiment, the sheet is an example of the component, and the sheet size and the sheet size information are an example of a component size and component size information, respectively. Further, for example, the sheet size of the body, a sheet size of the front cover, and a milling depth are associated with the bookbinding process as the default parameter.

FIG. 6 illustrates an example of an order information table 600 stored in the order storage unit 302. A plurality of pieces of order information (records) is stored in the order information table 600. Each of the pieces of order information (records) is information that associates the order ID, the merchandise ID, and the file path with one another. The order ID is information for identifying the order, and is an ID uniquely set for each order. The merchandise ID is information for identifying the merchandise information, and the order information and the merchandise information illustrated in FIG. 5 can be associated with each other with use of the merchandise ID. The merchandise information for acquiring the product can be identified by searching for the merchandise information based on the merchandise ID contained in the order information as a search key. The file path is information indicating a path of the print data (Portable Document Format (PDF) file) used when the product is printed for each component. The path of the PDF file is indicated as the file path in FIG. 6, but the file path may be a file path of print data in another format.

FIG. 7 illustrates an example of a job information table 700 stored in the job storage unit 304. A plurality of pieces of job information (records) is stored in the job information table 700. Each of the pieces of job information is information that associates a job ID, a job parameter, an update, and suspension with one another. The job ID is information for identifying the job generated by the job management unit 303, and is an ID uniquely set for each job. The job parameter is information indicating a parameter of the job actually used to produce the product. The job parameter is generated based on the default parameter of the merchandise information, and is updated as necessary based on the sheet size information received from the image forming apparatus 110.

Necessity/unnecessity of the update is information indicating whether the component size of the component used in the job should be updated, and the component requiring the update. For example, if the sheet size of the body is necessary, "body (BODY)" is recorded in the necessity/unnecessity of the update, and the body is removed from a field of the necessity/unnecessity of the update upon completion of acquisition of the body.

A suspension state is information indicating a transmission control state of the job. For example, for the product with the printing of the body thereof completed, a bookbinding job is kept in a suspended state (TRUE) for waiting for the update of the sheet size of the front cover, but a cutting job is released from the suspended state and brought into a state allowing the transmission (FALSE) because the sheet size is already updated with respect to the component requiring the update. The information processing apparatus 100 according to the present exemplary embodiment controls the transmission based on the suspension state, but, as another example, the information processing apparatus 100 may control the transmission by stopping generating a post-processing job until acquiring the sheet size information.

FIG. 8 illustrates a job information table 800 after the job parameter is updated based on the sheet size acquired from the image forming apparatus 110. The job information table 800 illustrated in FIG. 8 corresponds to the job information table 700 illustrated in FIG. 7. Suppose that the body of PhotoBook A is printed and the sheet size of the body is acquired. In response thereto, the value of the job parameter is updated to the received sheet size in job information 801 and job information 802, each of which is job information of the bookbinding job of PhotoBook A. Further, the body (BODY) is removed from the update (component requiring the update) in each of the job information 801 and the job information 802. Further, in the job information 802, the suspended state is cleared and is changed to the state allowing the transmission because of the removal of the component requiring the update.

FIG. 9 is a flowchart illustrating order registration processing by the information processing apparatus 100. The order registration processing is processing performed when an order is received. In step S900, the order management unit 301 analyzes the information about the received order line by line, and stores the order information that is the result of the analysis into the order storage unit 302 after associating the order information with the merchandise information stored in the merchandise storage unit 300 via the merchandise ID. Next, in step S901, the job management unit 303 generates the job information by reading out the order information stored in the order storage unit 302 and referring to the merchandise information based on the merchandise ID. The job management unit 303 stores the generated job information into the job storage unit 304. Further, the job management unit 303 generates a job ticket of the print job and also generates a job ticket of the post-processing job based on the job information.

Next, in step S902, the job management unit 303 analyzes the job information generated in step S901, and determines whether the post-processing job requires the sheet size information of the component. More specifically, the job management unit 303 determines that the sheet size information is not required if unnecessity (NOT NEEDED) is stored in the necessity/unnecessity of the update in the job information. If the sheet size information is required (YES in step S902), the processing proceeds to step S903. If the sheet size information is not required (NO in step S902), the job management unit 303 ends the order registration processing. In step S903, the job management unit 303 performs control so as not to transmit the post-processing job requiring the sheet size by changing the suspension state in the job information to the suspended state (TRUE). In this manner, the job in the suspended state is subjected to the restriction on the transmission of the job ticket to the device. The present processing is an example of state management processing that records the information indicating the suspension state.

FIG. 10 is a flowchart illustrating control processing regarding the printing by the image forming apparatus 110 and the post-processing by the subsequent post-processing apparatus 120. The control processing is performed by the information processing apparatus 100. In step S1000, the job management unit 303 transmits the job ticket of the print job to the image forming apparatus 110 via the device communication unit 306. Upon receiving the job ticket, the image forming apparatus 110 carries out the printing based on the received job ticket. While carrying out the print job, the image forming apparatus 110 transmits the sheet size information acquired from the sensor by the CPU 401 to the information processing apparatus 100 via the NC 406. Subsequently, in step S1001, the job management unit 303 of the information processing apparatus 100 receives the sheet size via the device communication unit 306.

Next, in step S1002, the job management unit 303 identifies the component (sheet) associated with the sheet size received in step S1001, and determines whether there is a post-processing job related to the identified component. The job management unit 303 determines that a job having the same ID at Order ID corresponding to a first half portion of the job ID illustrated in FIG. 7 is the related job. If there is a post-processing job related to the component (YES in step S1002), the processing proceeds to step S1003. If there is no post-processing job related to the component (NO in step S1002), the processing proceeds to step S1006.

In step S1003, the job management unit 303 updates the job information of the post-processing job identified in step S1002. More specifically, the job management unit 303 updates the sheet size information contained in the job parameter of the job information to the sheet size information received in step S1001. The information to be updated here is the sheet size information with respect to the same component as the sheet size information received in step S1001. The job management unit 303 further removes the component regarding the update of the sheet size information from the necessity/unnecessity of the update in the job information. The processing in step S1003 is an example of setting processing for setting the received component size as the component size to be referred to in the post-processing job. The job information of the post-processing job is updated in step S1003 in the present exemplary embodiment, but, as another example, the job management unit 303 may be configured to only store the sheet size information and does not have to generate the job information of the post-processing job.

Next, in step S1004, the job management unit 303 determines whether the update is completed with respect to all the component sizes requiring the update contained in the job information of the post-processing job identified in step S1002. The job management unit 303 determines that all of these component sizes are updated when the necessity/unnecessity of the update is set to "NOT NEEDED" in the job information (record) of the identified post-processing job. If all of these component sizes are updated (YES In step S1004), the processing proceeds to step S1005. If there remains the sheet size information that is not updated yet (NO in step S1004), the processing proceeds to step S1006.

In step S1005, the job management unit 303 changes the suspension state in the record of the post-processing job to the state allowing the transmission (FALSE). When the job information is updated in step S1003, and when the job information is updated in step S1005, the job management unit 303 also updates the job ticket of the post-processing job in response to the update. More specifically, the job management unit 303 updates the sheet size information contained in the post-processing job to the sheet size information received in step S1001.

In step S1006, the job management unit 303 determines whether the post-processing job corresponding to the same product as the print job regarding the job ticket transmitted in step S1000 is in the suspended state. The job management unit 303 determines that a job having the same ID as Order ID corresponding to the first half portion of the job ID in the job ticket transmitted in step S1000 is the job contained in the same product from the job information stored in the job storage unit 304. The job management unit 303 determines that the post-processing job is not in the suspended state if "FALSE" is set as the suspension state in the job information of the post-processing job corresponding to the same product. If the post-processing job is in the suspended state (YES in step S1006), the job management unit 303 ends the control processing. If the post-processing job is not in the suspended state (NO in step S1006), the processing proceeds to step S1007.

In step S1007, the device communication unit 306 transmits the job ticket of the post-processing job to the post-processing apparatus 120. With this transmission, the control processing is ended. In this case, after receiving the job ticket of the post-processing job, the post-processing apparatus 120 performs the post-processing according to the job ticket. In step S1007, the device communication unit 306 may transmit the job ticket immediately after the suspended state is cleared, or, as further another example, may transmit the job ticket after receiving the user operation.

FIG. 11 illustrates an example of the job ticket of the post-processing job generated based on the job information and transmitted to the post-processing apparatus 120. In the present exemplary embodiment, the job ticket of the post-processing job is generated when the job is generated in step S901 illustrated in FIG. 9, and is updated together with the job information in step S1003 illustrated in FIG. 10. As another example, the job management unit 303 may generate the job ticket after the suspended state of the job is cleared in step S1005 or before the job ticket is transmitted in step S1006 without generating the job ticket in step S901.

In the job ticket, the sheet size of the body is stored in lines 1101 and 1102. Further, the sheet size of the front cover is stored in a line 1103. The sheet size information acquired by the job management unit 303 in step S1003 is reflected in parameters regarding the sheet sizes stored in the lines 1101, 1102, and 1103. Updating the parameters regarding the sheet sizes in the lines 1101, 1102, and 1103 allows the post-processing apparatus 120 to perform control suitable for the sheet sizes of the sheets actually used in the post-processing.

In this manner, in the printing system according to the present exemplary embodiment, the information processing apparatus 100 generates the job ticket of the post-processing job with use of the sheet size of the sheet actually used in the printing by the image forming apparatus 110. This means that the printing system can prevent the post-processing from becoming unable to be normally performed due to a difference between the size of the component actually used in the post-processing and the component size defined in the job.

A first modification example of the present exemplary embodiment will be described. In the exemplary embodiment described above, the information processing apparatus 100 has been described referring to the example in which the information processing apparatus 100 sets the sheet size information regarding the sheet as an example of the component used in the printing by the image forming apparatus 110 to the job ticket of the post-processing job. However, the targeted component may be any component used in the printing or the post-processing, and shall not be limited to the sheet.

As a second modification example, in the case where the size of the component (sheet) actually used by the image forming apparatus 110 (hereinafter referred to as the used size) is set in the job ticket, the merchandise information corresponding to this used size does not have to contain the default parameter. However, in this case, the merchandise information is assumed to contain information indicating a type of the component requiring the used size in association with the merchandise ID. Then, the intended result can be achieved by processing the information in the "update" in the job information according to the information indicating the type of the component requiring the parameter.

Further, as a third modification example, the job information corresponding to the used size may be set so as not to contain the job parameter until the used size is received from the image forming apparatus 110 and contain the used size as the job parameter after the used size is received.

Having described a representative exemplary embodiment of the present disclosure in detail, the present disclosure shall not be limited to this specific exemplary embodiment and can be modified and changed in various manners within the range of the spirit of the present disclosure described in the claims.

Other Exemplary Embodiments

The present disclosure can also be embodied by processing that supplies a program capable of realizing one or more functions of the above-described exemplary embodiment to a system or an apparatus via a network or a storage medium, and causes one or more processors in a computer of this system or apparatus to read out and execute the program. Further, the present disclosure can also be embodied by a circuit (e.g., an application specific integrated circuit (ASIC)) capable of realizing one or more functions.

According to the present exemplary embodiment, it is possible to prevent the post-processing from becoming unable to be normally performed due to the difference between the size of the component actually used in the post-processing and the component size defined in the job.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-018182, filed Feb. 5, 2018, which is hereby incorporated by reference herein in its entirety.

What is claimed is:

1. An information processing apparatus comprising:
at least one processor and at least one memory coupled to each other and cooperating to perform control to:
transmit a print job to an image forming apparatus, including default dimensions of a medium on which to print;
receive from the image forming apparatus, after transmitting the print job, dimensions of the medium used in the printing of the print job; and
transmit to a post-processing apparatus, a job ticket of a post-processing job corresponding to the print job, in which, in a case where dimension information of the medium is used in post-processing, the received dimensions are set.

2. The information processing apparatus according to claim 1,
wherein control is performed so as not to transmit the job ticket in a case where the dimensions are not received.

3. The information processing apparatus according to claim 2, wherein control is further performed to record information indicating a suspended state in association with the post-processing job in the case where the dimensions are not received, and
wherein control is performed so as not to transmit the job ticket in a case where the information indicating the suspended state is recorded.

4. The information processing apparatus according to claim 3, wherein control is performed to record information indicating a state allowing the transmission instead of the information indicating the suspended state in a case where the dimensions are received, and
to transmit the job ticket if the information indicating the state allowing the transmission is recorded.

5. The information processing apparatus according to claim 1, wherein control is performed, in a case where dimension information of a plurality of sheet recording media is used in the post-processing, respective dimensions are set in the job ticket.

6. The information processing apparatus according to claim 5, wherein control is performed so as not to transmit the job ticket in a case where the respective dimensions of at least one of the plurality of sheet recording media are not set.

7. The information processing apparatus according to claim 5, wherein control is further performed to record information indicating a suspended state in association with the post-processing job in a case where the respective dimensions of the plurality of sheet recording media are not received,
wherein control is performed so as not to transmit the job ticket in a case where the information indicating the suspended state is recorded.

8. The information processing apparatus according to claim 7, wherein control is performed to record information indicating a state allowing the transmission instead of the information indicating the suspended state in a case where the respective dimensions of the plurality of sheet recording media are received, and
to transmit the job ticket in a case where information indicating the state allowing the transmission is recorded.

9. An information processing method performed by an information processing apparatus, the information processing method comprising:
transmitting a print job to an image forming apparatus, including default dimensions of a medium on which to print;
receiving from the image forming apparatus, after transmitting the print job, dimensions of the medium used in the printing of the print job; and transmitting to a post-processing apparatus, a job ticket of a post-processing job corresponding to the print job, in which, in a case where dimension information of the medium is used in post-processing, the received dimensions are set.

10. A non-transitory computer-readable medium storing a program causing a computer capable of executing an application to perform an information processing method, the information processing method comprising:

transmitting a print job to an image forming apparatus, including default dimensions of a medium on which to print;

receiving from the image forming apparatus, after transmitting the print job, dimensions of the medium used in the printing of the print job; and transmitting to a post-processing apparatus, a job ticket of a post-processing job corresponding to the print job, in which, in a case where dimension information of the medium is used in post-processing, the received dimensions are set.

11. The non-transitory computer-readable medium according to claim 10, wherein control is performed, in the transmitting, so as not to transmit the job ticket in a case where the dimensions are not received.

12. The non-transitory computer-readable medium according to claim 11, wherein information indicating a suspended state is recorded in association with the post-processing job in a case where the dimensions are not received, and wherein control is performed, in the transmitting, so as not to transmit the job ticket if the information indicating the suspended state is recorded.

13. The non-transitory computer-readable medium according to claim 12, wherein information indicating a state allowing the transmission is recorded instead of the information indicating the suspended state in a case where the dimensions are received, and wherein the job ticket is transmitted in a case where the information indicating the state allowing the transmission is recorded.

14. The non-transitory computer-readable medium according to claim 10, wherein, in a case where dimension information of a plurality of sheet recording media is used in the post-processing, the job ticket in which the received respective dimensions are set, is transmitted.

15. The non-transitory computer-readable medium according to claim 14, wherein control is performed, in the transmitting, so as not to transmit the job ticket in a case where none of the respective dimensions are set.

16. The non-transitory computer-readable medium according to claim 14, wherein information indicating a suspended state is recorded in association with the post-processing job in a case where the respective dimensions of the plurality of sheet recording media are not received, and wherein control is performed, in the transmitting, so as not to transmit the job ticket in a case where the information indicating the suspended state is recorded.

17. The non-transitory computer-readable medium according to claim 16, wherein information indicating a state allowing the transmission is recorded instead of the information indicating the suspended state in a case where the respective dimensions of the plurality of sheet recording media are received, and wherein the job ticket is transmitted, in the transmitting, in a case where the information indicating the state allowing the transmission is recorded.

* * * * *